US010013574B2

(12) United States Patent
Hore

(10) Patent No.: US 10,013,574 B2
(45) Date of Patent: Jul. 3, 2018

(54) METHOD AND APPARATUS FOR SECURE STORAGE AND RETRIEVAL OF ENCRYPTED FILES IN PUBLIC CLOUD-COMPUTING PLATFORMS

(71) Applicant: Bijit Hore, Riverside, CA (US)

(72) Inventor: Bijit Hore, Riverside, CA (US)

( * ) Notice: Subject to any disclaimer, the term of this patent is extended or adjusted under 35 U.S.C. 154(b) by 0 days.

(21) Appl. No.: 15/700,855

(22) Filed: Sep. 11, 2017

(65) Prior Publication Data

US 2017/0372094 A1   Dec. 28, 2017

Related U.S. Application Data

(63) Continuation-in-part of application No. 14/737,477, filed on Jun. 11, 2015.

(60) Provisional application No. 62/010,665, filed on Jun. 11, 2014.

(51) Int. Cl.
*G06F 21/00* (2013.01)
*G06F 21/62* (2013.01)
*G06F 17/30* (2006.01)

(52) U.S. Cl.
CPC .... *G06F 21/6227* (2013.01); *G06F 17/30312* (2013.01)

(58) Field of Classification Search
CPC .............................. G06F 63/04; G06F 63/0428
See application file for complete search history.

(56) References Cited

U.S. PATENT DOCUMENTS

| | | | |
|---|---|---|---|
| 2005/0038866 A1* | 2/2005 | Noguchi ........... | G06F 17/30864 709/217 |
| 2008/0065440 A1* | 3/2008 | Graham ................ | G06Q 30/02 705/7.33 |
| 2008/0244429 A1* | 10/2008 | Stading ............. | G06F 17/30554 715/764 |
| 2014/0025684 A1* | 1/2014 | Hess ................. | G06F 17/30699 707/741 |
| 2015/0244684 A1* | 8/2015 | Ng ......................... | H04L 67/10 713/168 |

* cited by examiner

*Primary Examiner* — Tri Tran

(57) ABSTRACT

In one aspect, a computerized Encrypted Drive System (EDS) server useful for keyword extraction and indexing server of includes a computer store containing data, wherein the data. The data includes an unencrypted document file and a computer processor in the EDS server. The computer processor obtains the unencrypted document file from the computer store. The computer processor extracts a keyword information from the unencrypted document file. The keyword information comprises of a set of keywords appearing in the unencrypted document file. The computer processor includes one or more colors from the color-set of each keyword into a document color-index of the unencrypted document file. The computer processor generates a Bloom filter encoding a set of keywords stored in a metadata field and the unencrypted document file, and wherein the Bloom filter is used to represent the set of keywords in the unencrypted document file.

17 Claims, 14 Drawing Sheets

```
CreateKeywordColorIndex(D,U)
    Extract set of distinct keywords from D→W
    Initialize document color set $C_D$ {}, BloomFilter $B_D$ {}
    For each keyword w in W
            Select one color in random from the color-set(w,U) and add to $C_D$
            Set Bits(w) in $B_D$
    Return ($C_D$, $B_D$)
```

```
CreateKeywordColorIndexNoisy(D,U,μ)
    Extract set of distinct keywords from D→W
    Initialize document color set C_D {}, BloomFilter B_D {}
    For each keyword w in W
            Select one color in random from the color-set(w,U) and add to C_D
            Set Bits(w) in B_D
    Select μ|C_D| random colors from the universal set and add to C_D
    Return (C_D, B_D)
```

```
CreateKeywordColorIndexesJointly(D, U₁, U₂, ..., Uₘ)
    Extract set of distinct keywords from D→W
    Initialize doc color sets C_{D,U1}, ..., C_{D,Um} {}, BloomFilters B_{D,U1}, ..., B_{D,Um} {}
    For each keyword w in W
            For each user U_i (i = 1...m)
                    Select one color in random from the color-set(w,U_i) and add
                    to C_{D,Ui}
                    Set Bits(w) in B_{D,Ui}
    Return (C_{D,U1}, B_{D,U1}), ..., (C_{D,Um}, B_{D,Um})
```

```
CreatePatternColorIndex(D, U_P, k)
    Extract set of distinct trigrams from D→P
    Initialize:
    document pattern-color set C^P_D {}
    Pattern BloomFilter B^P_D {}
        t-words set T  P //set of all length 1 t-words
    For i = 1,...,|D|-k  //starting positions for sliding window
            For word window win^k_i  // 'k' consecutive words starting at index 'i'
                    Determine all distinct trigrams from P present in win^k_i and create all length
                    2 and 3 t-words and add to T
        For each t in T
                Select one color in random from the color-set(t,U_P) and add to C^P_D
                Set Bits(t) in B^P_D
    Return (C^P_D, B^P_D)
```

METHOD AND APPARATUS FOR SECURE STORAGE AND RETRIEVAL OF ENCRYPTED FILES IN PUBLIC CLOUD-COMPUTING PLATFORMS

CROSS-REFERENCE TO RELATED APPLICATIONS

This application is hereby incorporated by reference in its entirety. This application claims priority to and is a continuation in part of U.S. patent application Ser. No. 14/737,477 filed on 11 Jun. 2015, U.S. patent application Ser. No. 14/737,477 claims priority from U.S. Provisional Application No. 62/010,665, and filed 11 Jun. 2014. These applications are hereby incorporated by reference in their entirety.

BACKGROUND

1. Field

The present invention relates generally to data encryption and, more particularly, to a system and method of secure storage and retrieval of encrypted files in public cloud-computing platforms.

2. Related Art

With the proliferation of mobile computing, virtual offices and a general 'computing on the go' culture, usage of cloud-based content management services like Box®, DropBox®, Google Drive® etc., has grown tremendously in recent years. The various online productivity features, along with the 'easy sharing' and 'access from anywhere' nature of cloud applications are increasing the use of these cloud-based content management applications within enterprises. As a result, vast amounts of corporate data are migrating to these services in the cloud. However, one pertinent issue that is a growing concern is that of privacy (and security) of data residing in the cloud. Data privacy and security regularly ranks amongst the top concerns for businesses, especially if the business is in a regulated industry and/or makes significant innovations and has a lot of sensitive and proprietary information to manage.

In spite of these concerns for data security, there is a surprising lack of support for enforcing data privacy in cloud-based content management applications across the board. The owner has to practically hand over his/her data to the service provider in order to get any meaningful service. Traditional data storage systems have acknowledged the need for greater security for data from malicious entities, and as a result, have implemented a variety of measures for securing data at rest: from relational database management systems (RDBMS), network attached storage (NAS) appliances, tape drives to PC hard drives, vendors today support granular data encryption. Vendors have also integrated suitable frameworks for encryption-key management and policy-based access control. However, when the database administrators themselves are not trusted by data owners (e.g. the case for public-cloud-computing platforms), some other mechanism for data encryption can be used that protects the data without affecting its usability in the cloud.

Techniques for client-side encryption of sensitive data, messages and documents have been added to some of the popular apps these days. However, in a bid go achieve end-to-end security, the data is rendered useless in its encrypted form. Specifically, for file and document centric applications this means storage platforms cannot look into the content of files and therefore, cannot index and search over encrypted content. Some new web-based applications are supporting a limited version of search on such encrypted content, but they are neither very secure, nor very scalable. While some of these techniques can search over structured data that has been encrypted using special techniques, they cannot do so over un-structured data, such as encrypted document collections.

SUMMARY OF INVENTION

In one aspect a computerized Encrypted Drive System (EDS) server useful for keyword extraction and indexing server includes a computer store containing data. The data includes an unencrypted document file and a computer processor in the EDS server. The computer processor obtains the unencrypted document file from the computer store. The computer processor extracts keyword information from the unencrypted document file. The keyword information comprises of a set of keywords appearing in the unencrypted document file. The computer processor includes one or more colors from the color-set of each keyword into a document color-index of the unencrypted document file. The computer processor generates a Bloom filter encoding a set of keywords stored in a metadata field and the unencrypted document file, and wherein the Bloom filter is used to represent the set of keywords in the unencrypted document file.

In another aspect, a computerized EDS server useful for pattern extraction and indexing server includes a computer store containing data. The data includes an unencrypted document file and computer processor in the EDS server. The computer processor obtains the unencrypted document file from the computer store. The computer processor extracts a pattern information from the unencrypted document file. The pattern information comprises of a set of character strings appearing in the unencrypted document file. The computer processor extracts all of a set of distinct trigrams appearing in the set of character string. The computer processor generates a trigram set. The trigram set comprises a set of distinct trigrams appearing in each string from the set of character strings. The computer processor generates a set of trigram-words by concatenating the trigram in a lexicographic order with a stop inserted between any two trigrams. The computer processor includes one or more colors from a color-set of each trigram-word into a document color-index of the unencrypted document file. The computer processor generates a Bloom filter encoding the trigram set stored in a metadata field the unencrypted document file, and wherein the Bloom filter represents the trigram set in the document.

In yet another aspect, a computerized EDS server useful for keyword extraction and indexing server of includes a cloud-store containing data. The data includes a source document file. A computer processor in the EDS server obtains the source document file from one cloud-store. The computer processor extracts the keyword information from the source document file. The keyword information includes of a set of keywords appearing in the source document file. The keyword information includes one or more colors from the color-set of each keyword into the plain color-index to be stored in the metadata field of a new target document file, wherein a color includes short unique character string label that is associated with a keyword or the document file. The computer processor generates a plain Bloom filter data structure. The computer processor writes the plain Bloom filter data structure into the metadata field of the target document file. The plain Bloom filter is used to compactly represent the set of keywords in the source document file. The target document file has no content besides a pointer to the source document file, and is stored independently in a separate cloud-computing platform data-store that is different from where the source document file is stored.

BRIEF DESCRIPTION OF THE DRAWINGS

FIGS. 11-14 illustrate screen shots of example algorithms, according to some embodiments.

Figure 1:
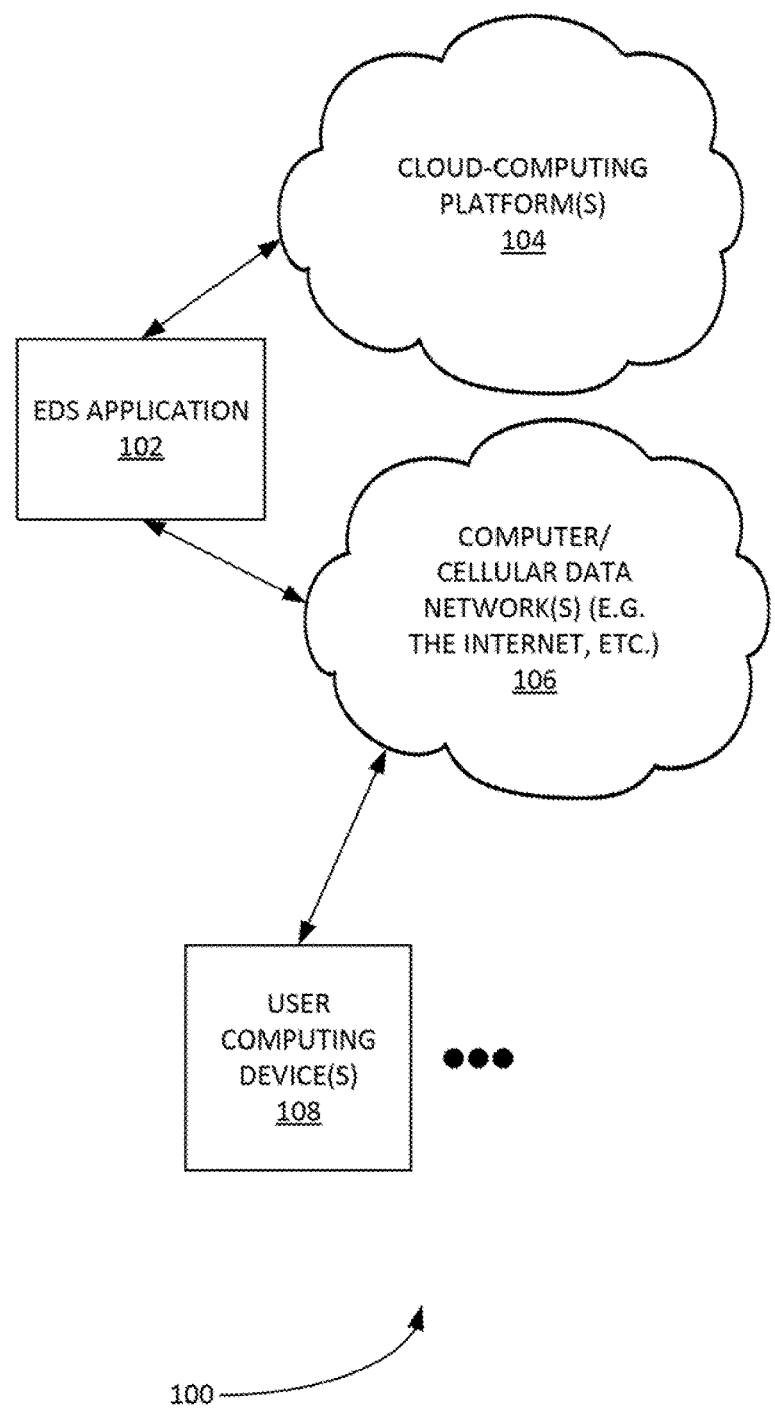
FIG. 1 illustrates an example computing system with en EDS application, according to some embodiments.

The Figures described above are a representative set, and are not an exhaustive with respect to embodying the invention.

DETAILED DESCRIPTION

Disclosed are a system, method, and article of manufacture of secure storage and retrieval of encrypted files in public cloud-computing platforms. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions and Example Algorithms

Advanced Encryption Standard (AES) is a specification for the encryption of electronic data established by the U.S. National Institute of Standards and Technology. AES can support a block length of one hundred and twenty-eight (128) bits and key lengths of one hundred and twenty-eight (128), one-hundred and ninety two (192), and two-hundred and fifty six (256) bits.

Keyword is a string of characters that appears in a document and separated from other keywords by separators such as space and punctuation marks. It could be a dictionary word or an arbitrary string of characters from a pre-defined set (such as ASCII or UNICODE character set)

Pattern refers to a string of characters from a fixed character-set (e.g. ASCII, UNICODE, etc.) and the special set including of {_,*,%}. A pattern is used as a compact mechanism to specify the set of all character strings that 'match' the pattern. Example, 'fac%' denotes the set of all character strings that have the prefix 'fac'. Refer to the more elaborate example in the document.

Pattern queries or pattern-matching queries refer to the class of queries that specify a pattern as the predicate of a query issued to a search system. In response to such a query, the search system retrieves (and returns to the query issuer) the set of all items (documents in the present embodiment) that match the pattern. The present embodiments can support a subset of regular expressions where a pattern is specified as a string of characters chosen from the set of alphanumeric characters and these symbols: '*', '_', '%'. The symbol '*' denotes any number of repetition of a pattern, such as the pattern '(ab)*' matches the empty string and all strings of the form ab, abab, ababab, etc. The symbol '_' matches any single character. So, the pattern 'ab_c' can match strings like abac, abbc, abcc, abdc, abec, . . . ab1c, ab2c, etc. Finally, '%' stands for 'any string'—example: 'ab%cd' can match strings abcd, abacd, abaaaacd, ab234dfcd, e.g. all strings starting with 'ab' and ending in 'cd'. Multiple of these symbols can be combined in a pattern expression, for example, '(ab)*cd_', (ab)*(cd)*_xy_' are all valid patterns that can be issued as queries.

Color can be a label (e.g. a short unique character string) that is associated with a keyword or a document. A color is an element of the color-set that refers to the finite set of colors (e.g. a universal set).

Sliding word window can be of size 'k' starting at position 'p' in a document refers to the set of k consecutive words beginning at position p in the document.

Bloom Filter is a data structure that allows very fast evaluation of set-membership queries. It is defined by two (2) positive integers 'n' and 'm', where n is typically much larger than m (n>>m). The Bloom Filter is initiated with a bit-array B of size n, with all bit-positions set to 0. Also, there are m hash functions $h\_1()$ . . . $h\_m()$ that are fixed in the beginning. Each hash function maps an input element (e.g., the string 'computer') to a bit-position between 1 and n. To note the presence of element 'e' (in the set represented by the Bloom Filter as a whole), the insertion algorithm computes the bit-positions $h\_1(e), h\_2(e), \ldots, h\_m(e)$ and sets those bit-positions to 1 in B. This is done for every element of the set being represented by the Bloom Filter. Now, to check the presence of an element 'x', check the bit positions $B[h\_1(x)], B[h\_2(x)], \ldots, B[h\_m(x)]$ and if all of them are 1, then it is assumed that element x is present in the set. Note that this process can generate false-positives (e.g. falsely concluding that an element is present in the set when it is not), but does not generate false-negatives, e.g. never say that an element is absent when it is present in reality. For appropriately chosen values of m and n, the rate of false-positives can almost be made negligible (e.g. probability of a false-positive can be made very close to zero (0)).

The following is an example of a Bloom Filter being used to represent keywords in a document. In one case, a document is seen as a set of keywords (e.g. set of character strings) and therefore can be represented using a Bloom Filter data structure. For example, Bloom Filter parameters can be set to n=ten thousand (10000) and m=ten (10) for all documents. Then, for each string 's' (keyword) in a document, the bit-positions can be set as $B[h\_1(s)], B[h\_2(s)], \ldots, B[h\_10(s)]$ of its corresponding Bloom Filter bit array to one (1). Multiple independent Bloom Filters per document can be stored (e.g. initialized potentially with different values for parameters n and m and different set of hash functions).

Middleware can be computer software that provides services to software applications beyond those available from the operating system. In the current context, it refers to the set of services provided by an Encrypted Drive System (EDS), such as file encryption/decryption, encryption key management activities, query processing etc.

Platform as a Service (PaaS) can be a category of cloud computing services that provides a platform allowing entities to develop, run and manage Web applications without the complexity of building and maintaining the infrastructure typically associated with developing and launching an application.

RSA (Rivest-Shamir-Adleman) cryptosystem is a public-key (asymmetric) cryptosystem, used to secure communication and other sensitive data items such as symmetric encryption keys (AES keys) etc. In RSA scheme, the encryption key is public and differs from the decryption key, which is kept secret. In RSA, this asymmetry is based on the practical difficulty of factoring the product of two large prime numbers, the factoring problem. Anyone can use the public key to encrypt a message, but with currently published methods, if the public key is large enough, only someone with knowledge of the secret key can feasibly decrypt the message.

Adversarial models and attack scenarios relevant to the current setup are now discussed. There can be two primary kinds of adversaries—internal/insider and external adversary. There can be two corresponding attack scenarios: (1) an 'insider' is a malicious agent who has access to server-side data and metadata, such as a malicious database administrator on the Cloud Provider's side; (2) an 'external' attacker (such as a hacker) is one who is able to penetrate the user's cloud account by some mechanism (phishing, social engineering etc.). In both cases, the adversary/attacker can be assumed to be a malicious agent who tries to learn the information within sensitive documents stored within a user's cloud drives. The actual attack can be carried out in very different ways for the two cases. An insider may have easy access to user's data and metadata, which can be used to figure out sensitive information either directly or indirectly (e.g. via inferences made from analyzing the metadata). Similarly, in the external attack scenario, a hacker after compromising a user's account can easily access all files and documents without any problem or restrictions.

Example Methods and Systems

In some embodiments, a method can provide seamless encryption of data files before uploading them to a public cloud storage system, while still maintaining the ability to search, access, manipulate and share the data files. Methods are provided that enable encrypted documents and files containing textual data to be searched and retrieved from the public cloud storage platform in response to keyword and pattern queries by the users of the system.

In some embodiments, a system and method is provided for use of public cloud stores by providing a data security framework that protects sensitive documents and files stored in the cloud. Protection can be provided from external and/or internal attacks. The sensitive documents and files can be encrypted (and/or obfuscated). For example, the sensitive documents and files (e.g. the 'data' and 'files' as used infra) can be encrypted while in storage, in state of being transferred and while in state of active use. The system can include a middleware EDS application. The EDS application can add a functional security layer around the data stored within a public cloud application.

In an exemplary embodiment, a user can link a personal account of a public cloud storage platform (e.g., Google Drive® or Dropbox®) to the EDS application. The user would them be able to encrypt his/her files before uploading them to any of these cloud-computing platforms (e.g. a linked storage service(s) such as, inter alia: Google Drive®, Drop Box® etc.).

The user can continue to access the native features and functionalities of the cloud-computing platforms. This can include, inter alia: accessing his/her files from multiple devices; searching of files using keyword queries; searching of files using pattern queries; sharing encrypted documents and files securely (e.g. without decrypting and exposing their content to the cloud-computing platform) with co-workers etc. In some examples, decrypting files can expose its contents, to the cloud-based service. An EDS application can provide the same set of features as the user's regular access to their cloud-based application. However, the EDS application provides a significantly higher level of security since it transforms the sensitive data using 'strong' (e.g. AES-256) encryption. Even if the user's cloud account is compromised, the sensitive files can be protected as they are encrypted. The encryption keys can be securely stored at a separate location (e.g. as selected by the user from multiple options provided by EDS).

In this way, an EDS application can provide the user with the controls to decide how, when and/or where the user's data is stored, accessed, shared and/or exposed (e.g. to a service provider) in a cloud-computing platform. Further, the EDS application can protect data from the server-side adversaries, such as, inter alia: snoopers (e.g. a malicious system administrator), external hackers (e.g. a hacker may obtain access to a cloud account illegally by phishing or social engineering), third-party malicious services/applications (e.g. malicious applications can leak information or run inference algorithms covertly to glean sensitive information from data), etc.

Example Systems

FIG. 1 illustrates an example computing system 100 with an EDS application, according to some embodiments. EDS application 102 can be a middleware-layer application. Users can use user-computing device(s) 108 to interact with data files stored in cloud-computing platform 104. EDS application 102 can implement the various methods and/or services provided herein. EDS application 102 can provide a security layer around existing cloud storage services provided in cloud-computing platform 104 to provide enhanced protection to data and a key store located separately from the EDS for securely storing keys used to encrypt data files (e.g. documents, etc.). EDS application 102 can provide a convenient interface to specify data-protection policies across connected cloud-storage applications and an enforcement mechanism for these policies. EDS application 102 can implement standard functionalities such as accessing, search and/or sharing directly on the encrypted data by implementing secure key-management protocols, secure indexing and querying of encrypted data. By aggregating multiple cloud-based services in an interface, EDS application 102 can extend the capabilities of some of the services. For instance, EDS application 102 can search over file contents stored across the services and show integrated search results (e.g. even though some of them do not provide it natively). EDS application 102 can be implemented on a typical web-server or on a PaaS cloud such as the Google App Engine® (GAE) or Amazon Web Services® (AWS) platform.

An example embodiment can use GAE as the platform of choice to illustrate various interactions of the EDS with an underlying PaaS cloud. GAE can provide functionalities that typical web-application servers do. Some of the services GAE can provide can be, inter alia: persistent storage with queries, sorting, and transactions; automatic scaling and load balancing; asynchronous task queues for performing work outside the scope of a request; scheduled tasks for triggering events at specified times or regular intervals; integration with other Cloud-based services and application programming interfaces (APIs). Computer/cellular data networks 106 can be used to communicate with and/or transfer a user's data files.

Figure 2:
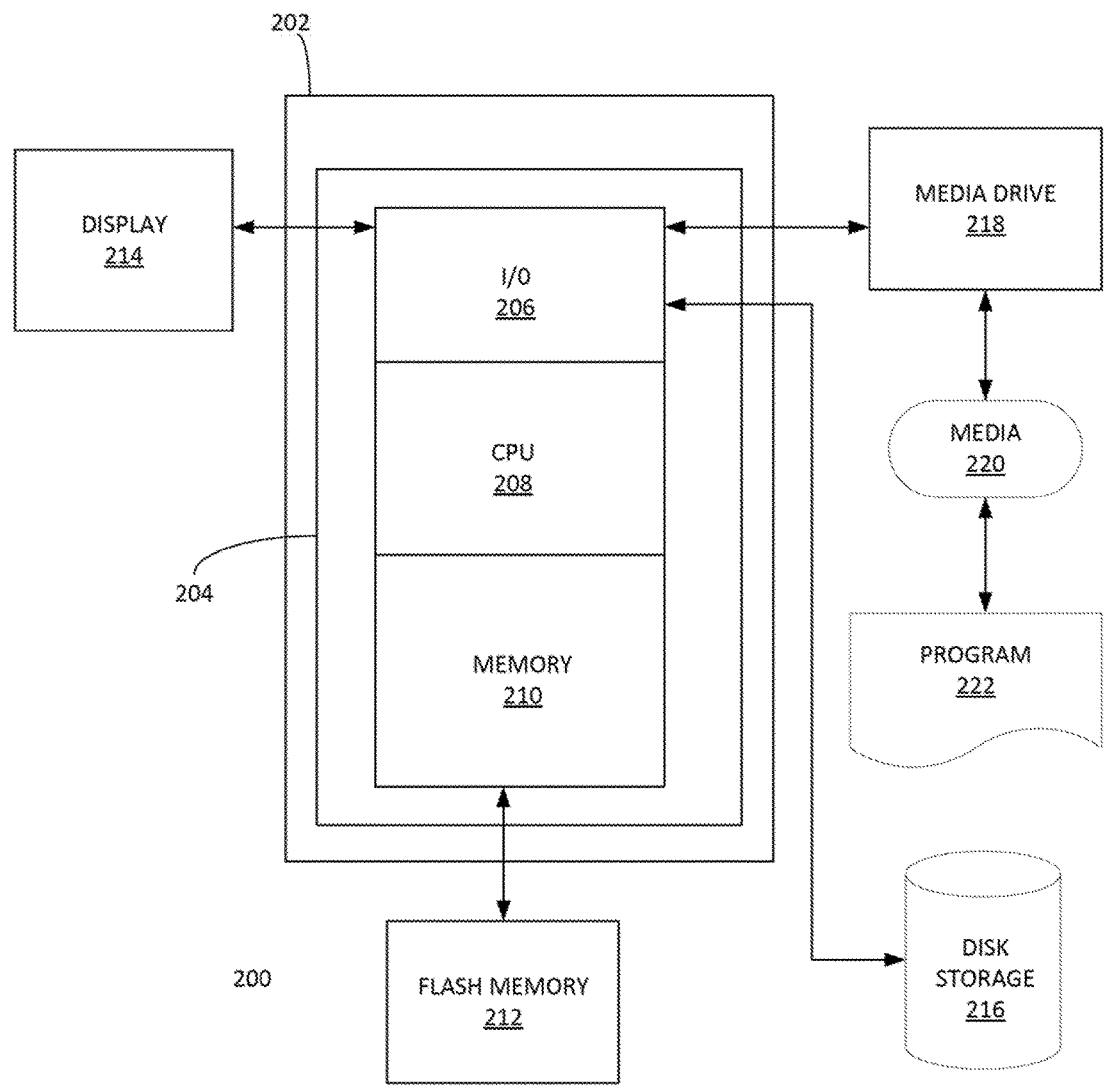
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g. monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
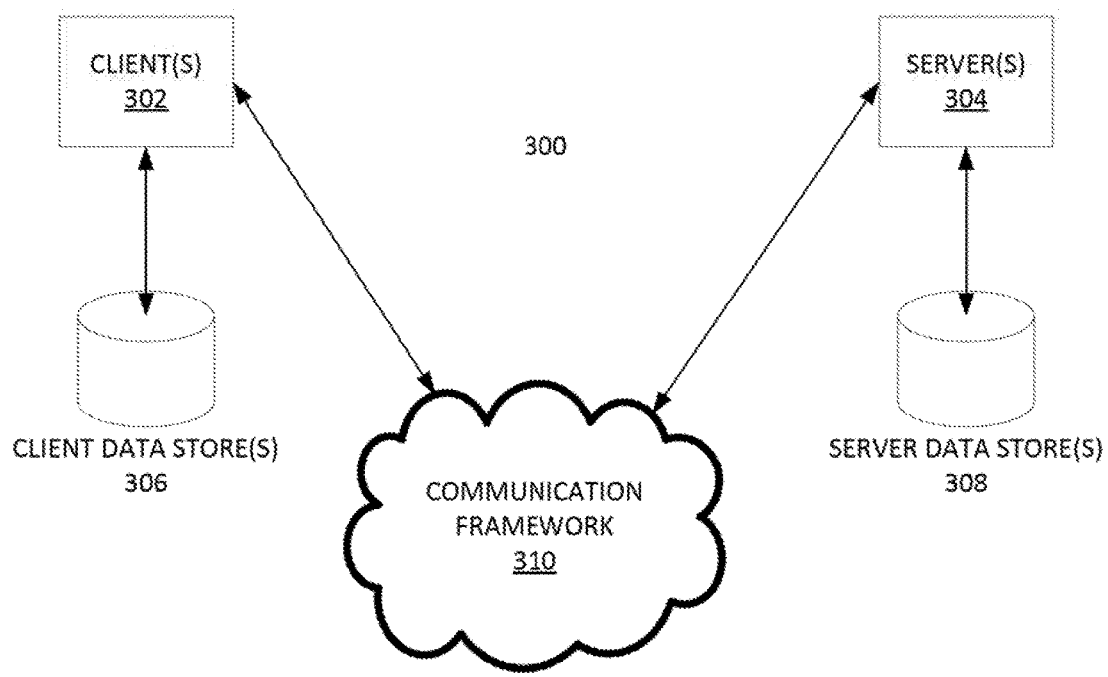
FIG. 3 is a block diagram of a sample-computing environment that can be utilized to implement various embodiments.

FIG. 3 is a block diagram of a sample-computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform. Alternatively, in some examples, system 300 can be implement in a cloud-computing environment.

Example Methods

Figure 4:
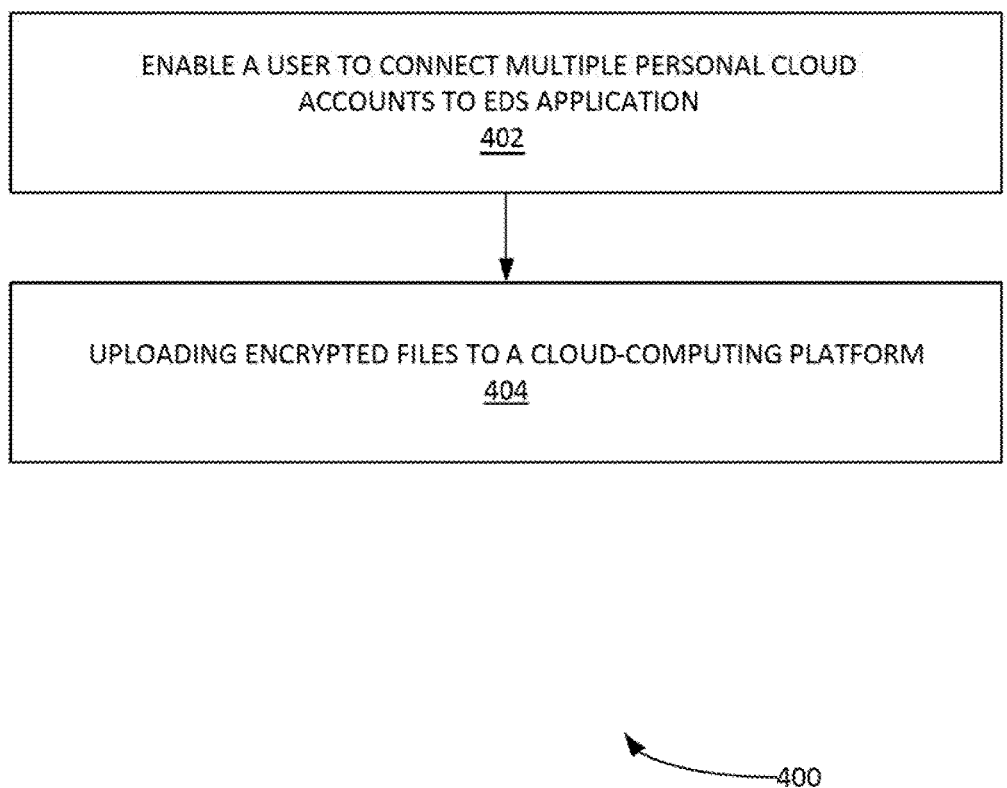
FIG. 4 illustrates an example process for uploading encrypted data, according to some embodiments.

FIG. 4 illustrates an example process 400 for uploading encrypted data, according to some embodiments. In step 402, a user can connect multiple personal cloud accounts (e.g. Google Drive®, Dropbox®, etc.) and upload encrypted data files securely to them. For example, data files can be encrypted with an AES-128/256 algorithm before uploading them to a cloud-computing platform (e.g. cloud-computing platform 104 of FIG. 1). In step 404, users can upload files from their local machine and/or choose pre-existing files in their cloud stores and encrypt them. The encryption keys can be managed by an encryption-key server using a secure key management setup that is transparent to users. Users are able to share their encrypted files and/or secure-folders (e.g. folders containing encrypted files) with one another.

Figure 5:
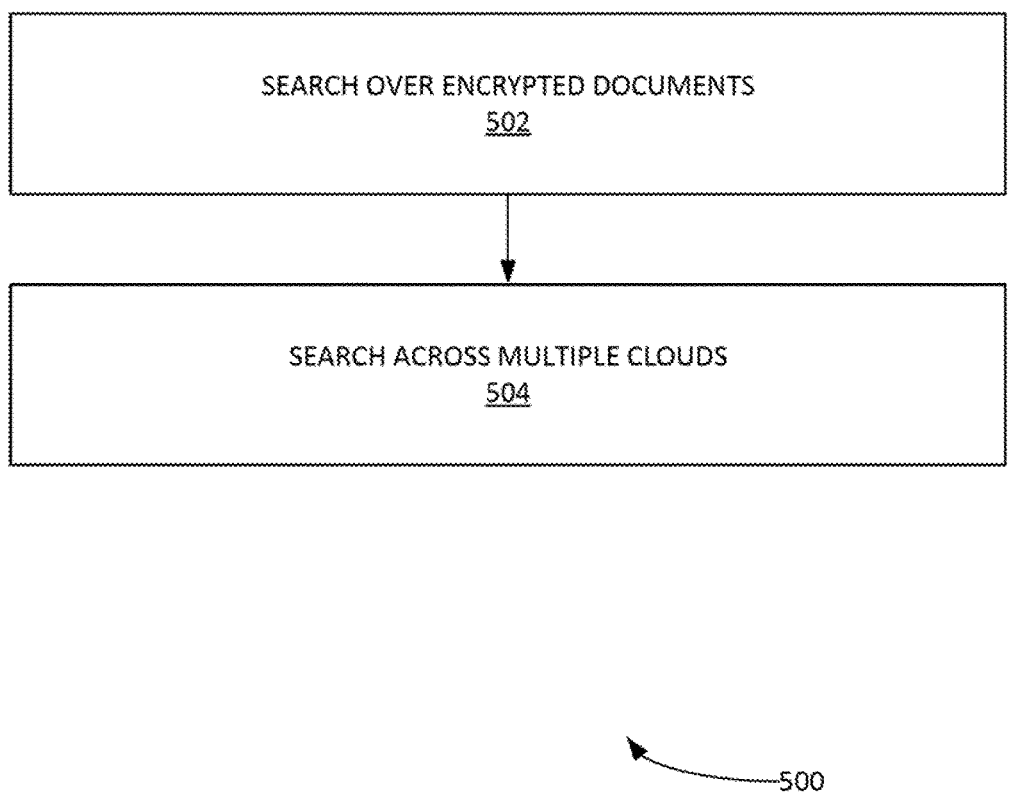
FIG. 5 illustrates an example EDS process for searching over encrypted data, and across multiple cloud accounts according to some embodiments.

FIG. 5 illustrates an example EDS process 500 for searching over encrypted data, according to some embodiments. Various aspects to search in EDS can include, inter alia:

searching over encrypted documents and/or searching across multiple clouds. In step 502, process 500 can search over encrypted documents. In step 504, process 500 can search across multiple clouds. Users can issue search queries against their unencrypted and/or encrypted data files and retrieve the ones that match the search criteria.

Figure 6:
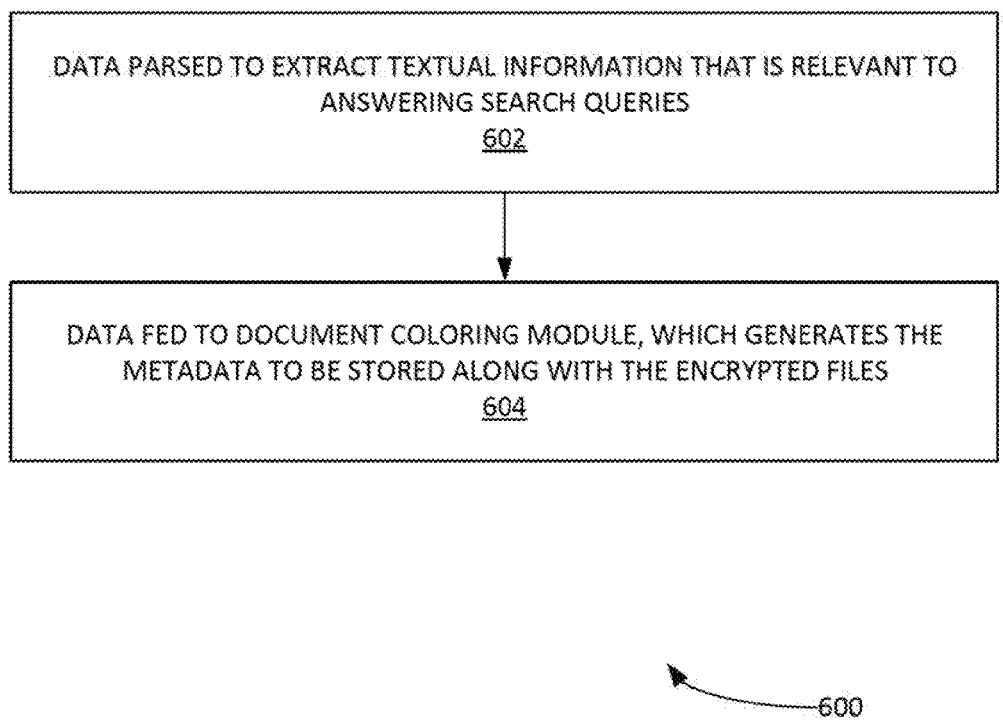
FIG. 6 illustrates an example EDS process for extracting information from documents and creating metadata to enable search over encrypted documents, according to some embodiments.

FIG. 6 illustrates an example EDS process 600 for searching over encrypted documents, according to some embodiments. EDS process 600 supports keyword and pattern-based search (e.g. as shown in the example provided infra) over the set of user's encrypted documents in the connected cloud-computing platforms through secure data annotation (e.g. secure metadata and/or secure indices, etc.) for function evaluation and search. In step 602, when users encrypt files, the file data can be first parsed to extract textual information that is relevant to answering search queries. This data can then be fed to the 'document coloring' module. The document-coloring module can generate the metadata to be stored along with the encrypted files in step 604. The format of this metadata enables EDS process 600 to store it, along with the data, and allows EDS process 600 to leverage existing functionalities of the underlying platform to implement those features on the encrypted data directly. For instance, EDS process 600 uses indexing and/or search functionality of Google® Drive to implement efficient and scalable full-text search over the user's collection of documents, encrypted or otherwise, across all of his linked public-cloud storage accounts. Search queries may be appropriately transformed to allow execution on the encrypted data, thereby revealing minimal information. The metadata used for indexing can be computed in a manner so as to limit the risk of any partial information disclosure about the sensitive information within the data/file.

Various example aspects of a secure search in EDS are now provided. In a first example of secure document storage and annotation, a document-coloring algorithm for generating secure metadata for indexing and search in the cloud is provided. The secure storage part can also include persisting the encryption keys in a key-value data store in the cloud so that they can be retrieved or shared.

In a second example, a description of search query execution is provided. The query processing can be implemented in two phases. In the first part, the user query is parsed and transformed into a form that can be executed on the obfuscated representation of the encrypted files stored as metadata in the cloud-computing platform. Then, in the second phase executed on the EDS, the results returned by the cloud-based service are pruned to eliminate false positives. Finally, the matching results are returned to the client in some sorted order and displayed on the user's device.

An example of a keyword query is now provided. A keyword query can be a Boolean expression where elements are various keywords. Accordingly, any document that satisfies the query expression is included in the result set. For example, the query 'computer AND science' can match all document that contains both the words 'computer' and 'science'. The query expression 'computer OR science' can match all documents that contain at least one of the two words. A more complex Boolean expression can be 'computer AND (science OR engineering)'. This query matches all documents that contains d 'computer' and at least one of the two words 'science' or 'engineering'. The process can search and retrieve even encrypted documents that satisfy such Boolean expressions, without having to decrypt the documents first.

An example of a pattern query is now provided. As defined in an earlier section, for pattern queries, a subset of regular expressions can be supported in the EDS. Queries, like 'comp%', 'aba*', can be issued by users. Documents (e.g. both encrypted and plain) containing text that match the pattern can be retrieved efficiently and shown to the user.

Figure 7:
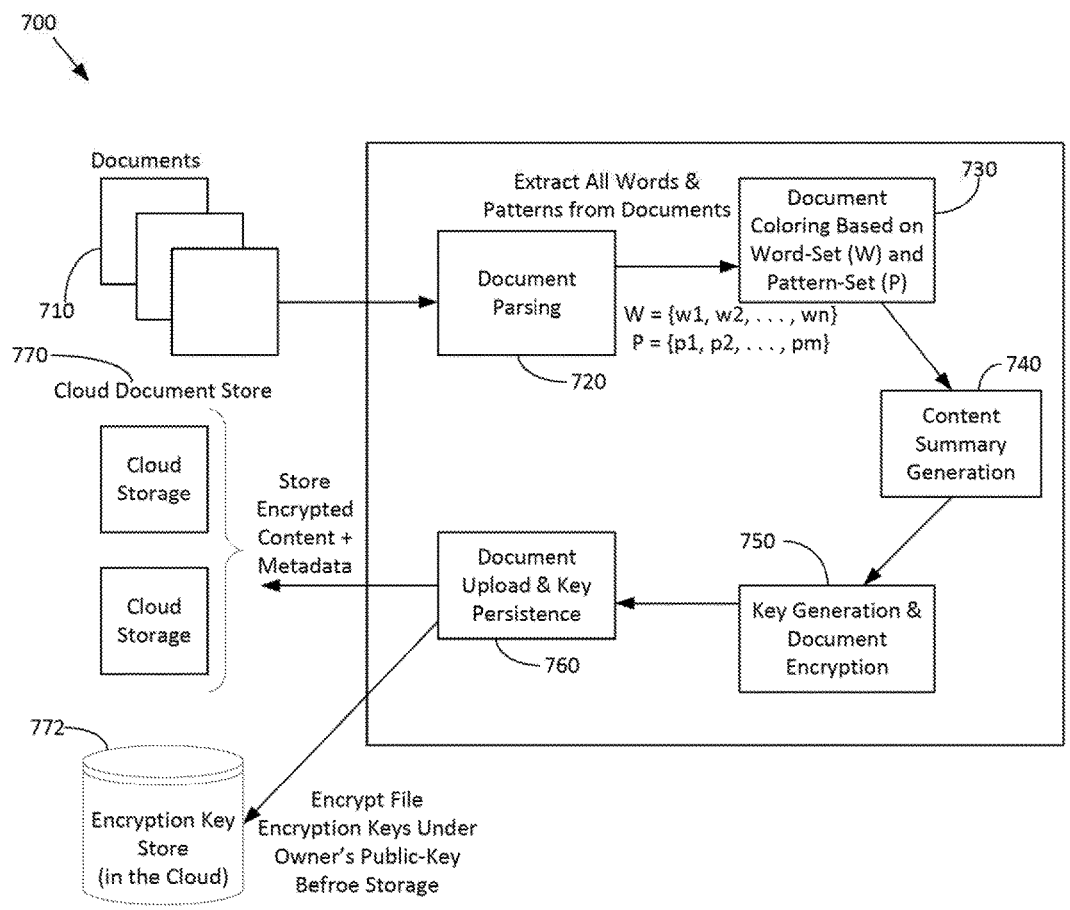
FIG. 7 illustrates an example EDS process for secure document storage, metadata creation and annotation for enabling keyword and pattern search queries on a set of encrypted documents stored in the cloud, according to some embodiments.

FIG. 7 illustrates an example EDS process 700 for secure document storage and annotation, according to some embodiments. Referring to FIG. 7, documents 710 are first selected for encryption and storing in a cloud-computing platform 760. Documents 710 are parsed to extract words and patterns from its text content in step 720. EDS process 730 can generate metadata for documents based on the keywords contained in the document.

Document coloring can be performed based on the extracted word-set (W) and the extracted pattern-set (P) in step 730. A part of the metadata generated for a document is referred to as the color-tag-set of the document (or simply 'document colors'). The process of generating the color-tags from a document is referred to as the 'document coloring algorithm' (or simply the 'coloring algorithm'). The document parser can accept as input any file with text content and extracts from it the distinct set of keywords and patterns that are present. The process of coloring a document based on extracted information involves, initialization of the parameters of the coloring algorithm as per user's instructions/ security requirements (e.g. referred to as user's coloring scheme) a coloring process based on set of keywords in document and a coloring process based on set of patterns extracted from the document.

The color-set (w,U) of a keyword 'w' with respect to user U can be defined as a fixed set of 'k' distinct colors (e.g. where k is a small positive integer) chosen from a given universe of N colors, where typically N is a positive integer that is much larger than k. For example, this color-set can be chosen at random. Once chosen, the color-set can remain fixed for a given user U. For instance, when a new user U initiates an account with the EDS service, a random 128-bit string (key) kU can be generated. Using this key, every word or pattern can be mapped to a fixed subset of k colors out of the universe of N colors. This mapping remains fixed for a given key (and the user) unless a new key is assigned to the user for some reason. These colors can be used for encoding presence of keywords in a document and for querying encrypted documents as described below. The pseudo-code for the basic coloring algorithm is given in FIG. 11.

The colors computed for a document by the coloring algorithm are represented as tags, like 'color_1', 'color_2', etc. These tags can be written into the metadata field of the corresponding encrypted file or maintained in a separate table with the document-id as the key. An example goal can be to store these tags in a form that can be indexed for fast retrieval, to process search queries. An example of how user-issued search queries in plain text are transformed into search queries on the color tags is provided infra.

A more secure version of the above scheme can be one where a certain fraction of the colors generated for a document index are selected at random—also called 'noise-infusion'. In this case, the system can select some $\mu|C\_D|$ random colors from the universal set of colors (for some $0<\mu<1$) and add to the color index C_D. This infusion of noise is critical for the security of documents with smaller number of keywords. An example pseudocode for this is given in FIG. 12.

Document-content summary can then be generated using Bloom filters in step 740. The content summary can be stored in a metadata field. One or more Bloom filter(s) may be created per document and stored as metadata associated with the document. Bloom filters are compact data-structures used for 'set membership queries' (e.g. refer to the 'Definitions' section supra). EDS process 700 can use Bloom filters for checking if a keyword is present in a document returned from the cloud store to the EDS 700 in response to a query. According to one embodiment, the Bloom filters can be serialized (e.g., in-memory objects can be converted into a suitable ASCII/binary string that can then be written to a file or a storage medium, etc.) and stored along with the color-tags in the same metadata field. In another embodiment, the Bloom filters corresponding to a document can be stored in a separate key-value data store in the cloud-computing platform. In yet another embodiment, multiple Bloom Filters can be used per document to record the presence of keywords depending upon the frequency (e.g. popularity) with which the keyword appears in the document and/or in a random user query. After generation of the content summary, key generation and document encryption are performed in step 750. Then, the document can be uploaded to any of the connected cloud drives 760 and encryption keys are persisted in a separate, secure key store 762.

An example of a search over shared encrypted documents is now discussed. When a first user of EDS process 700 shares a protected (encrypted) document d with a second user, EDS process 700 can share the AES encryption key of document d with the second user using a public-key based sharing mechanism. EDS process 700 can enable the second user to retrieve d in response of a search query if the query predicate is satisfied by document d. To enable this, EDS process 700 can execute document parsing, document coloring based on word-set (W) and pattern-set (P) in the document d using the coloring scheme of the second user. Alternately, the EDS process 700 may decide that there should be a common coloring scheme to be used for a 'secure shared folder' (e.g. when files remain in encrypted format). Users of EDS process 700 that have access to this shared folder can use the same coloring scheme to write files into the folder or issue search queries against it.

Color tags generated for document d that are associated with the first user (e.g. the owner) are stored in the metadata field of document d. However, tags generated for the second user may be stored separately in a different indexable data store or a key-value data store in the cloud. This can assist in easy removal of the color-tags of the second user if the first user chooses to 'un-share' the document at a later time.

There may be optimizations possible for speeding up the coloring of a document when it is being shared with multiple users. An example speed-up optimization is provided by the joint-coloring algorithm illustrated in the FIG. 13.

A detailed example of Color Tagging (e.g. a document coloring algorithm) is now provided. To make an encrypted document searchable, an EDS can generate 'metadata' from the contents of the document before encrypting and storing it in the cloud. The cloud-storage services can index not only the content of documents, but also many of the associated metadata fields to make them searchable. For example, the underlying cloud store can index the following metadata fields besides the content (e.g. body) of the document: 'document title' field, the 'document description' field etc. The EDS can generate a set of color-tags for a document. This can be a list of tags (text strings) like these: 'color_23434', 'color_654' etc. These strings can then be written into one or more of the metadata fields of the document (e.g. separated by blank space) that are indexed by the underlying cloud-based service.

Each distinct keyword in the document can be first identified and mapped to one color randomly from a set of k colors, where k is a small integer like ten (10), fifteen (15), twenty (20). As mentioned above, the set of k colors for a keyword is selected out of the 'set of all colors', which is typically much larger N ten-thousand (10,000) sized fixed set called the 'universal set of colors'. The k-set for each string, referred to as the 'color-code of the keyword' can also be fixed. For example, let k=five (5), the keyword 'computer' has the color-code $\{c1, c22, c390, c1264, c5009\}$ chosen from the set of all color tags $\{c1, c2, \ldots, c10000\}$. Then, in a document d_A containing the keyword 'computer', it can be mapped to 'c1' and in another document d_B also containing the word 'computer,' it can map to 'c1264' and so on. Once each (distinct) keyword in a document is mapped to a color in this way, the set of all color-tags in the index-set of the document (e.g. the set of colors to which one or more words in the document have been mapped to) are written into the metadata field. The second component of the metadata field of a document can be the byte-encoded representation of its Bloom filter. Any object/data structure in the memory can be serialized into a text string and stored (e.g. persisted on disk or file) and later again 'de-serialized' and read back into the memory by another function when needed.

The above-mentioned scheme for representing encrypted documents in a cloud-computing platform (e.g. using color-tags in metadata field) is an 'obfuscated representation' of the document. Obfuscation results from the fact that the color-tags are chosen at random from the color-code of each keyword in the document. Since multiple keywords in the dictionary can map to a single color, by looking at the color-index of a document the adversary (for instance, a malicious administrator at the cloud-based service provider) is not able to guess which keyword is actually present in the document.

Figure 8:
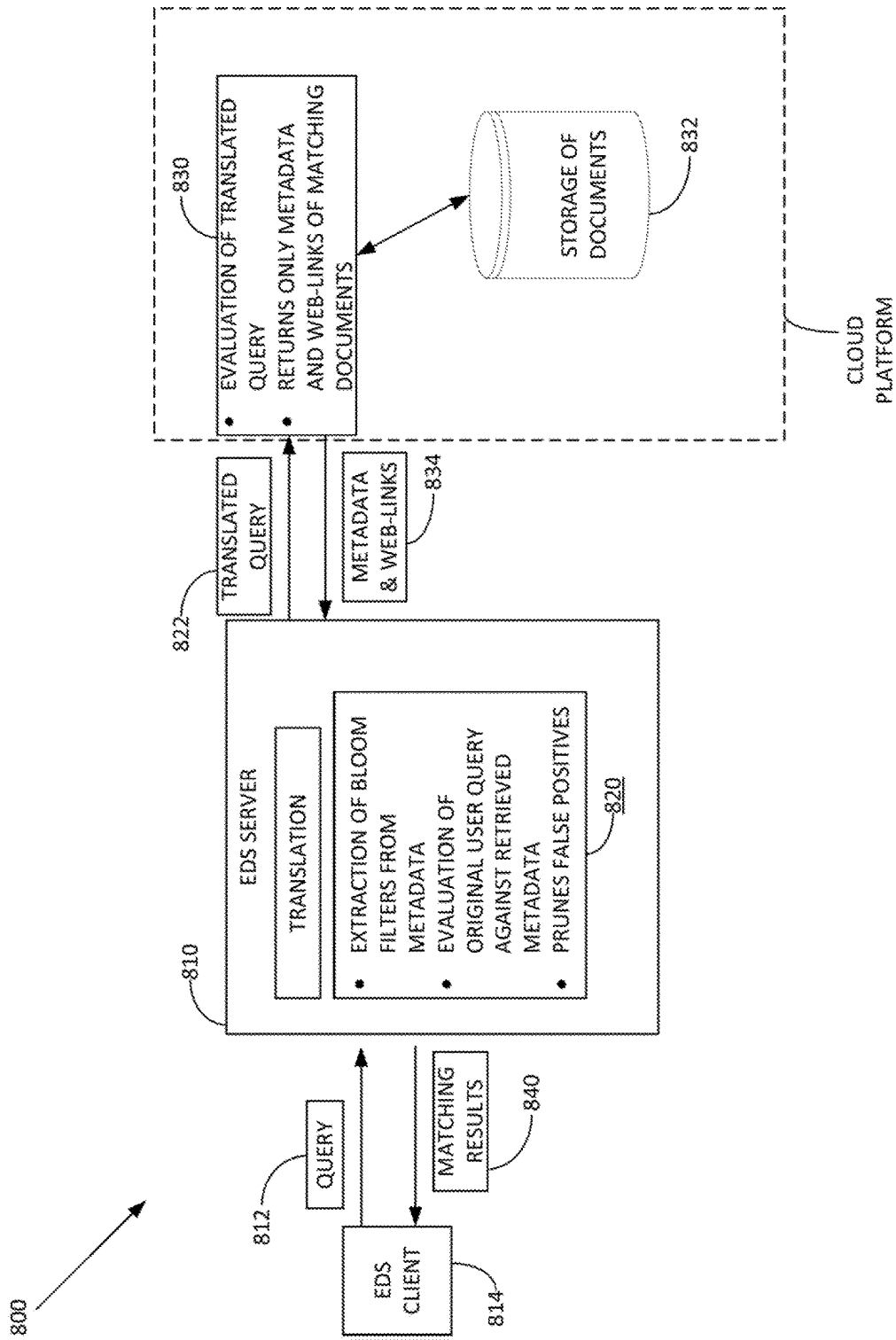
FIG. 8 illustrates a process for executing a search query on encrypted documents according to an embodiment.

As illustrated in FIG. 8, metadata can be used by EDS 800 to evaluate search queries issued by a user from a client device (e.g., personal laptop and/or mobile device) and return matching results to the user's device. Query classes supported by EDS 800 can include keyword queries, multi-keyword search queries using, for example, Boolean connectives 'AND' and 'OR' to specify the selection criterion. Pattern queries can search for a text pattern that satisfies a regular expression or a subset thereof (e.g. the class of queries supported by SQL-Like queries or open source library Lucene's wildcard queries' framework).

The user can launch a search by issuing a simple query term like 'computer' or a more complex Boolean expression like 'computer AND (science OR engineering)' into the search bar from the client. The query expression can be conveyed to the EDS server by the client application. The EDS server can then translate this query expression to one that can be evaluated over encrypted documents stored in users' cloud stores. Since the body of the encrypted document is garbled, the query cannot be directly evaluated against the encrypted contents. Instead, the query the EDS server first maps the original user query to the domain of the color-tags stored in the metadata field of a document and then issues it to the cloud.

An example search query evaluation in EDS is now discussed. FIG. 8 illustrates a process 800 for executing a search query according to an embodiment. Process 800 can be executed by an EDS. In FIG. 8, a server of the EDS 810 receives queries 812 issued by a user through use of an EDS client 814 and then performs query translation 820. The EDS 800 issues the translated queries 822 to the cloud 830. The cloud 830 evaluates the translated queries against stored documents 832. The cloud 832 then returns metadata and web-links 834 of matching documents 832 to the EDS server 810. The EDS server 810 extracts Bloom Filters from the metadata 834 and evaluates the original user query 812 against the Bloom Filter extracted from this returned metadata 834. By determining which documents match the query criteria, the EDS server prunes false positives and returns a final set of matching results 840 to the EDS client 814. In step 840, matching results can be displayed in sorted and paged format. The EDS client 814 may also be requested to pull more matching results 840 from the user's cloud store.

An example portion of search query that is processed in the cloud is now provided. Referring back to the example given earlier, let us consider the single keyword query 'computer', e.g. user wants to retrieve all documents, which contain the word 'computer' in its body or title. Then, EDS server can issue the following query (q) to the underlying cloud (e.g. a storage layer) 'color_1 OR color_22 OR color_390 OR color_1264 OR color_5009', which can retrieve any document that contains these strings in its title, body or any of the searchable metadata fields. The cloud-computing platform processes the query 'q' and returns all the matching documents' metadata to the EDS server in some sorted order (e.g. sorted on the 'last accessed/modified time stamp' or 'document size'). Note, the EDS can construct a disjunctive (OR) query comprising all the colors corresponding to the query keyword 'computer'. Such a query can be a 'covering-query' because it is guaranteed to match all documents that contain the keyword 'computer'. In general, a covering-query can refer to any query whose answer-set contains all entries that match the original query predicate. The answer-set to a covering-query may contain false-positives.

An example of how a portion of search is processed on the EDS server is now provided. The first step of the query evaluation process consists of the EDS generating a covering-query from the original user-issued query, which is to be evaluated against the color-tags of the encrypted documents. This query translation can be implemented on EDS server. Then, after the matching results are returned by the cloud platform, the pruning of false-positives is done on the EDS server and the results are returned to the client where user gets to see them in some ranked order.

A method of pruning false positives is now provided. From each metadata field returned to the EDS server, a method of pruning false positives can extract the substring that encodes the Bloom Filter and recreates it (e.g. by de-serialization) in memory. Then, the method can check if the original query term (e.g. 'computer' in our running example) is present in the Bloom Filter or not. If it returns 'Yes', then the title and link of this document can be added to the list of items to be sent to the client application. All the others (e.g. that return 'No') can be pruned.

Ranking examples are now discussed. There may be several embodiments for processing and evaluating the query response to generate the result set to be shown to the user. Ranking of query results is performed by 'last modified/accessed' timestamp of the documents. In general, ranking of results can be done based on any attribute that admits a comparison operation like 'size of files', 'title' (e.g. lexicographic comparison) etc.

Figure 9:
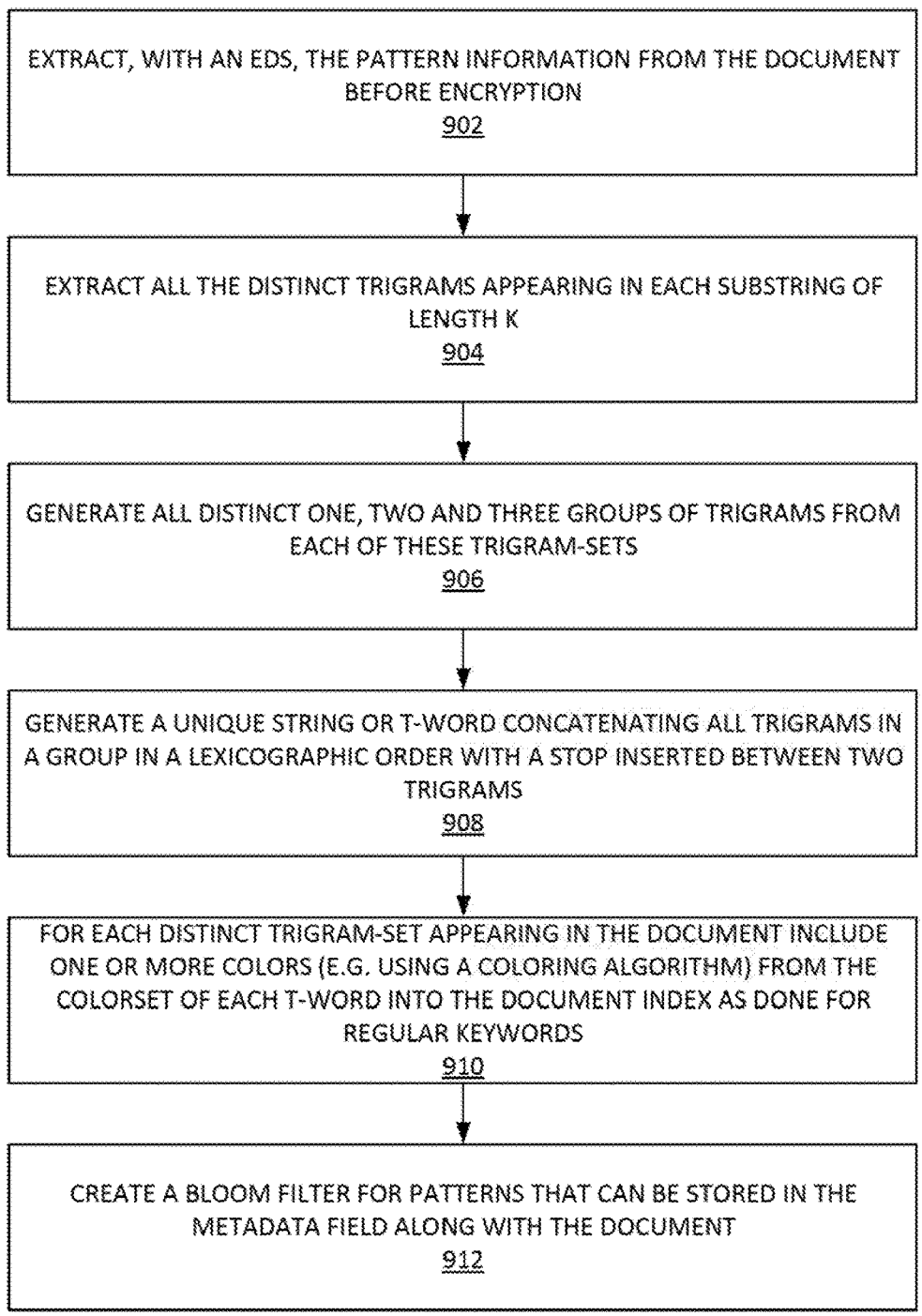
FIG. 9 illustrates an example process of pattern extraction and indexing to support pattern-matching queries on encrypted documents, according to some embodiments.

Example methods of pattern-information extraction and metadata generation for supporting pattern queries on encrypted documents is now discussed. FIG. 9 illustrates an example process 900 of pattern extraction and indexing, according to some embodiments. In step 902, in order to execute pattern queries on documents that are stored in encrypted form in the cloud, the EDS can extract pattern information from the document before encryption (e.g. per the example provided infra). For each word-window of length 'k' in the document, where k is an input parameter (could be something like four to five (4-5) for instance), extract all the distinct trigrams appearing in the string (e.g. including k consecutive words from the document, etc.) in step 904. Then, generate all one two and three sets from each of these trigram sets in step 906. These (1, 2, 3)-sets represent the trigrams that appear together in the string (e.g. the string of k keywords present in the word window). For each distinct trigram set extracted from a document (e.g. from one or more of the words in the document), process 900 generates a unique string by concatenating them in a lexicographic order with a stop ('.') inserted between two trigrams in step 908. The system can refer to them as trigram-words or t-words for short. The t-words can be treated as unique words in the document. Each document can result in t-words of length 3, 6 or 9 since EDS concatenates three (3) trigrams at most. So, for each unique t-word in the document, system generates a color-set. Then, process 900 includes one or more colors (e.g. using a coloring algorithm) from each color-set into the document index as done for regular keywords in step 910. Similar to keywords, in process 900, the EDS can create a Bloom filter for patterns that can be stored in the metadata field along with the document in step 912. Thus, a 'Patterns Bloom Filter' can be used to represent the set of (e.g. distinct) t-words in the document.

In one example, a short document (consisting of three (3) words) is provided—d: 'car ran fast'. Process 900 can extract patterns from this document in order to support pattern queries of the following type 'car%', '%fas?' etc., where '%' denotes any string of 0 or more characters and '?' denotes a zero (0) or one (1) character. Process 900 extracts and indexes the patterns from the text such that our query evaluation process can determine that both the above-mentioned queries match the document d. This is illustrated below with the help of an example. Process 900 can consider a word-window of size two (2), then it can have two windows to consider for the document 'car ran' and 'ran fast'. The trigrams generated from the first window are 'car, ar_, r_r, _ra, ran' and from the second window are 'ran, an_, n_f, _fa, fas, ast' (representing '_' for the space character). The (1, 2, 3) long t-words generated from these two windows can then be {car, ar_, r_r, _ra, ran, an_, n_f, _fa, fas, ast} U {car.ar_, car.r_r, car._ra, car.ran, ar_.r_r, ar_._ra, ar_.ran, r_r._ra, r_r.ran, _ra.ran, . . . } U {car.ar_.r_r, car.ar_._ra, car.ar_.ran, . . . } (e.g. the components of t-words have not been lexicographically sorted, but concatenated in the order they appear in the example document 'd'). These t-words can be considered to be present in the document and can be noted as such in the index created for search.

In one embodiment, where both pattern and keyword matching queries are to be supported on encrypted documents, process 900 and an equivalent process for keyword extraction and indexing can generate the two-distinct set of colors (e.g. one each for supporting the two classes of queries, etc.) and populate the corresponding Bloom filters. The pseudocode for the keyword queries is described herein (e.g. see CreateKeywordColorIndex in FIG. 11 and CreateKeywordColorIndexNoisy in FIG. 12). An example pseudocode for pattern generating the color index and Bloom Filter for pattern queries is provided in FIG. 14.

In the algorithm shown in FIG. 14, a t-word is treated similar to a normal keyword for the purposes of computing the document's pattern color-index and insertion into the pattern Bloom filter associated with a document. The second input parameter in the algorithm (U_p) denotes the universal color set used for t-words. The color tags used to encode the t-words in a document are distinct from the color tags used to encode for keywords.

Example embodiments of pattern-search query evaluation are now discussed. For evaluating patterns in queries, EDS can extract from the query expression, the unique trigram sets and using them, construct the query to be issued to the cloud as the following two examples illustrate.

In one example, given the query 'hippo%', then EDS extracts three (3) trigrams 'hip', 'ipp', 'ppo'. The t-word generated from this can be 'hip.ipp.ppo'. Then query issued can be the OR of the colors in the set color-set ('hip.ipp.ppo'). This query can be issued to Google and the returned set of file metadata can be checked for actual existence of the query pattern. After the file metadata is retrieved from Google, EDS can de-serialize the pattern Bloom filters for the files returned and check the presence/absence of the patterns from the query and eliminate the false positives, i.e., discard those file entries whose pattern Bloom Filter do not contain the t-word 'hip.ipp.ppo'.

In one example, query 'hippo%mus' can generate a more complex conjunctive query: '(hip,ipp,ppo) AND (hip.ipp.mus) AND (hip.mus.ppo) AND (ipp.mus.ppo)'. From the returned list of file metadata from Google, the system can extract the pattern Bloom filters and check if all of these t-words are present in each of these pattern Bloom filters (or not). If the system finds a match, then it can include the file name in the final result list.

The encrypted query evaluation technique illustrated supra can result in false positives for both keyword and pattern queries. However, while the false positive rates can be made arbitrarily small for keyword queries (e.g. by selecting a large enough values for the Bloom filter's bit-vector size), it is not so for pattern-queries. In the trigram based approach for pattern queries, there is always a finite probability of getting false-positive matches. Increasing the bit-vector size or choosing a different number of hash functions in the Bloom filter cannot reduce this rate any further. These false-positives can be eliminated by scanning the content of the actual file after decryption.

Example embodiments of extending EDS capabilities to connected cloud accounts are now discussed. In still another embodiment, EDS can provide new features and/or capabilities across connected cloud stores, such as full-text search and sharing files securely with contacts across clouds.

Figure 10:
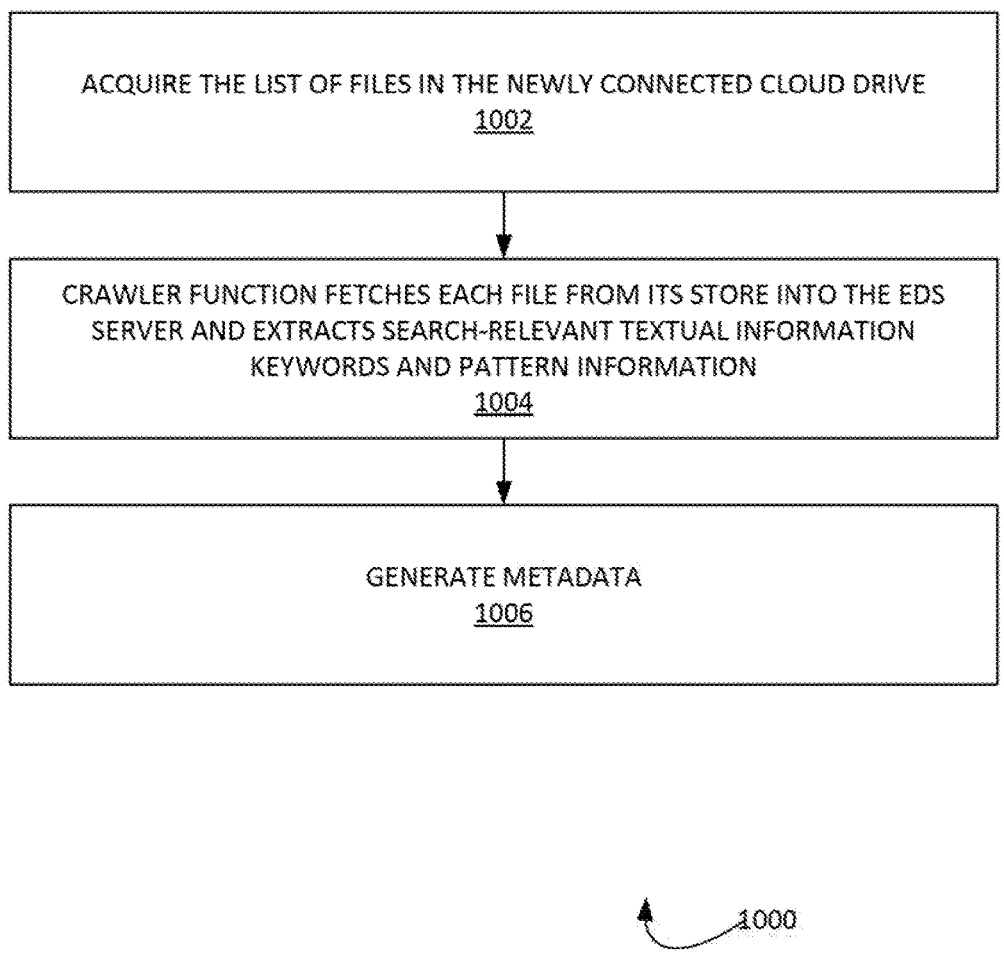
FIG. 10 illustrates a process by which documents and files in all EDS connected cloud drives can be indexed to support full-text search, according to some embodiments.

In some embodiments, EDS can provide full-text search over all connected cloud drives. FIG. 10 illustrates a process 1000 by which documents and files in connected cloud drives can be indexed to support full-text search, according to some embodiments.

When a new cloud storage is connected to EDS by a user, the process 1000 acquires the list of all files in the newly connected cloud drive in step 1002. Then, a document-crawler & indexing process can fetch each file from its store into the EDS server and extract search-relevant textual information, such as keywords and pattern information from it in step 1004. From the extracted information, metadata can be generated in 1006. Metadata can include of two components: an indexable component and a second ('summary') component. The indexable component can be a set of text strings. These are computed in a manner similar to how it is done for encrypted files.

A process using keyword queries is now provided. The process for pattern queries can be similar. EDS can map each distinct keyword to a unique tag from a given universe of tags. The algorithm can be similar to the coloring algorithm for encrypted files described above. However, each keyword and pattern can be hashed to a single tag instead of multiple. The second component can be same as that in the case of encrypted files (e.g. a Bloom Filter that encodes the presence of keywords in the document). The EDS can optionally choose to keep more than one Bloom filter per document. For instance, EDS can choose to split the encoding of keywords into multiple sets if the document is large. Alternately, EDS can choose to encode the same set of elements into two or more independent Bloom filters.

In some embodiments, there can be two options to store metadata generated by the EDS process for searching over connected cloud files: (a) The EDS can create a content-less (e.g. empty) placeholder file within one designated cloud-computing platform connected to EDS for every file in another cloud drive (e.g. they are similar to 'symbolic links' used in UNIX). These files' metadata field contains the search-relevant data (tags and Bloom Filter) for files in other connected accounts. These placeholder-files are simply created so that they can be indexed and made searchable, similar to the approach taken for indexing encrypted files. If they match the search criteria, the associated link (e.g. to the original file) can be provided to the user. (b) The search-relevant metadata for each file in a connected cloud store is persisted separately in a high availability data store (such as the Data store in Google App Engine®) for quick access. This way, the EDS can create a centralized document index, which is stored and managed on the server-side. The index can store the Bloom Filter and tags in separate fields of the entry associated with a document. The transformed query can be evaluated against the tags stored in the index and the Bloom filter object is returned for the matching entries, which are further probed to eliminate false-positives from the final result list to be shown to the user.

Various methods of updating indices can be implemented. For example, the files that have been removed, updated or added/created to the connected drives can cause changes to the stored index data. When files are added from the EDS interface, the changes can be reflected in the index right away. However, since files can be added to the cloud drives from outside the EDS client or sharing mechanism, maintaining updated indices for search can use regular scans of the drives to detect changes. Such scans while done regularly can result in some delay in reflecting the updates in search results, and therefore, the state reflected in the search index can be stale.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized Encrypted Drive System (EDS) server useful for keyword extraction and indexing server of comprising:
   a computer store containing a data, wherein the data comprises: an unencrypted document file;
   a computer processor in the EDS server, which computer processor:
      obtains the unencrypted document file from the computer store;
      extracts a keyword information from the unencrypted document file, wherein the keyword information comprises of a set of keywords appearing in the unencrypted document file;
      includes one or more colors from the color-set of each keyword into a document color-index of an encrypted document file, wherein a color comprises a short unique character string label that is associated with a keyword in the document file;
      generates a Bloom filter data structure; and
      writes the Bloom filter data structure into a metadata field associated with the encrypted document, wherein the Bloom filter is used to compactly represent the set of keywords in trigram-words form in the unencrypted document file, and wherein a representation of the Bloom filter data structure is encrypted with a RSA (Rivest-Shamir-Adelman) encryption algorithm or an AES-256 (Advanced Encryption Standard, 256 bit).

2. The computerized EDS server of claim 1, wherein the computer processor in the EDS server: determines that a number of keywords in the document file is below a specified threshold.

3. The computerized EDS server of claim 2, wherein the computer processor in the EDS server: randomly adds a set of noise keywords into the set of keywords extracted from the document file, whereby an infusion of noise keywords increases a security of documents that comprise a small number of keywords.

4. The computerized EDS server of claim 2, wherein the computer processor in the EDS server: randomly generates a set of colors to be added to the document index, whereby the infusion of colors increases the security of documents that contain a small number of keywords.

5. The computerized EDS server of claim 4, wherein the computer processor implements a joint-coloring algorithm for two or more documents together when multiple documents are being encrypted simultaneously in order to speed up processing on the server.

6. The computerized EDS server of claim 4, wherein the coloring algorithm comprises generating a set of color tags computed for the encrypted document file that is associated with a first user, wherein the color tags are stored in the metadata field of the encrypted document file, and computes a second set of color tags for a second user with whom the encrypted document file is to be shared.

7. The computerized EDS server of claim 6, wherein the second set of color tags are stored separately in a different searchable data store or a key-value data store in a cloud-storage platform.

8. The computerized EDS server of claim 1, wherein the computer processor: receives a search query expression provided by a user.

9. The computerized EDS server of claim 8, wherein the EDS server translates a query provided by the user to a covering-query on color tags that is issued to the cloud-storage platform to search over a set of encrypted documents stored in a portion of the cloud-storage platform associated with the user.

10. A computerized Encrypted Drive System (EDS) server useful for pattern extraction and indexing server of comprising:
    a computer store containing data, wherein the data comprises: an unencrypted document file;
    a computer processor in the EDS server, which computer processor:
       obtains the unencrypted document file from the computer store; extracts a pattern information from the unencrypted document file, wherein the pattern information comprises of a set of character strings appearing in the unencrypted document file, wherein each character string represents a unique segment of the text of the unencrypted document within which query patterns will be searched for or matched against;
       extracts all of a set of distinct trigrams appearing in the set of the character strings;
       generates a trigram set, wherein the trigram set comprises the set of all distinct trigrams appearing in any string from the set of character strings;
       generates a set of trigram-words corresponding to each character string in the set of trigram-words by concatenating the trigrams appearing in the character string in a lexicographic order with a stop inserted between any two trigrams; includes one or more colors from a color-set of each trigram-word into a document color-index of the encrypted document file; and
       generates a Bloom filter data structure and writes the Bloom filter data structure into a metadata field associated with the encrypted document, wherein the Bloom filter is used to compactly represent the set of trigram-words appearing in one or more of the character strings generated from the document.

11. The computerized EDS server of claim 10, wherein the computer processor generates a pattern color index, and a pattern Bloom filter, both of which together are used for evaluating pattern queries against the encrypted document file.

12. The computerized EDS server of claim 10, wherein the computer processor; receives a pattern search query expression provided by a user.

13. The computerized EDS server of claim 12, wherein the EDS server then translates the query provided by the user by extracting a set of unique trigrams from the query expression; and using the set of unique trigrams to construct a covering-pattern-query on color tags that is issued to the cloud storage platform to search over encrypted documents stored in a portion of the cloud-storage platform associated with the user.

14. A computerized Encrypted Drive System (EDS) server useful for keyword extraction and indexing server of comprising:
    a cloud-store containing data, wherein the data comprises;
       a source document file; a computer processor in the EDS server, which computer processor:
          obtains the source document file from one cloud-store;
          extracts the keyword information from the source document file, wherein the keyword information comprises of a set of keywords appearing in the source document file;

includes one or more colors from the color-set of each keyword into the plain color-index to be stored in the metadata field of a new target document file, wherein a color comprises short unique character string label that is associated with a keyword or the document file;

generates a plain Bloom filter data structure; and writes the plain Bloom filter data structure into the metadata field of the new target document file, wherein the plain Bloom filter is used to compactly represent the set of keywords in trigram words form in the source document file; and the new target document file has no content besides a pointer to the source document file, and is stored independently in a separate cloud-computing platform data-store that is different from where the source document file is stored.

15. The computerized EDS server of claim 14, wherein the computer processor generates a plain color index, and a plain Bloom filter, both of which together are used for evaluating plain text queries against the source document file.

16. The computerized EDS server of claim 14, wherein the computer processor: receives a search query expression provided by a user.

17. The computerized EDS server of claim 16, wherein the EDS server translates the search query expression by the user to a covering-query on a set of color tags corresponding to the plain color-index, and is issued to the cloud-storage platform to search over a set of plain documents stored in a portion of the cloud-storage platform associated with the user.

* * * * *